T. O. ORGAN.
FEED WATER HEATER AND PURIFIER.
APPLICATION FILED APR. 22, 1910.
1,081,138.
Patented Dec. 9, 1913.
3 SHEETS—SHEET 1.
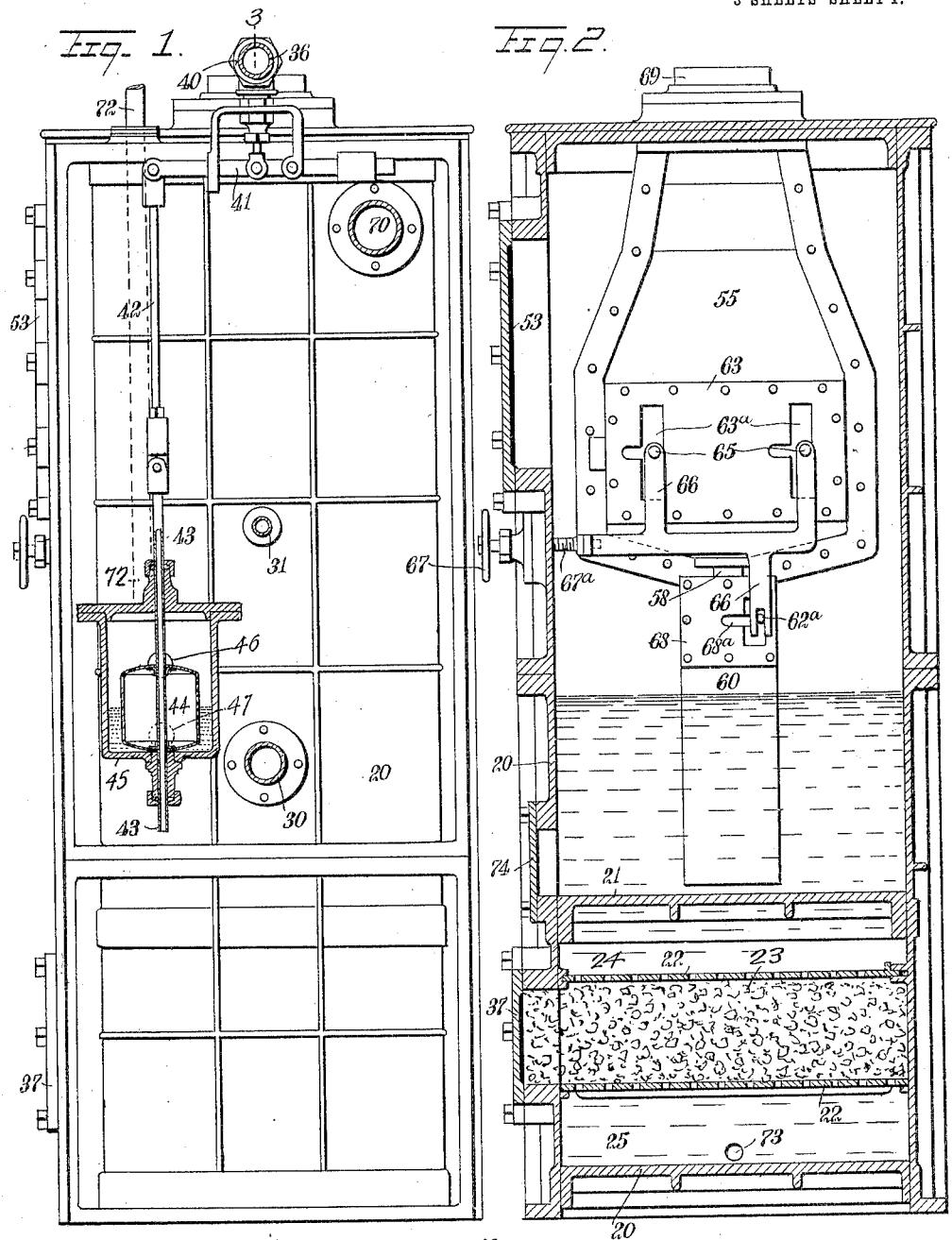
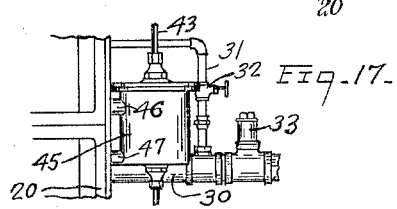
WITNESSES:
H. J. Walker
J. P. Davis
INVENTOR
Thomas Opie Organ
BY Munn & Co.
ATTORNEYS

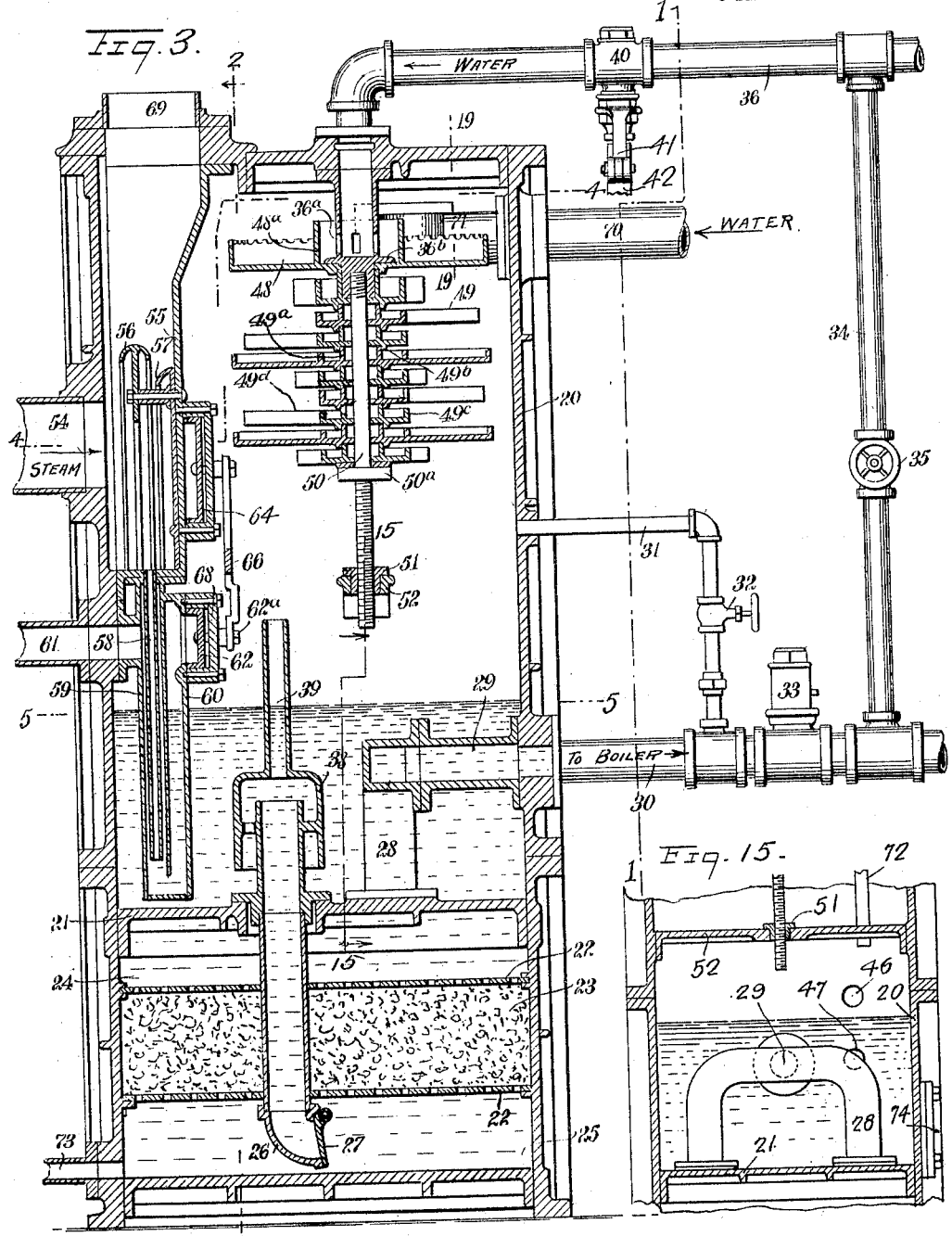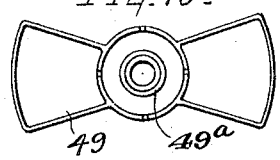

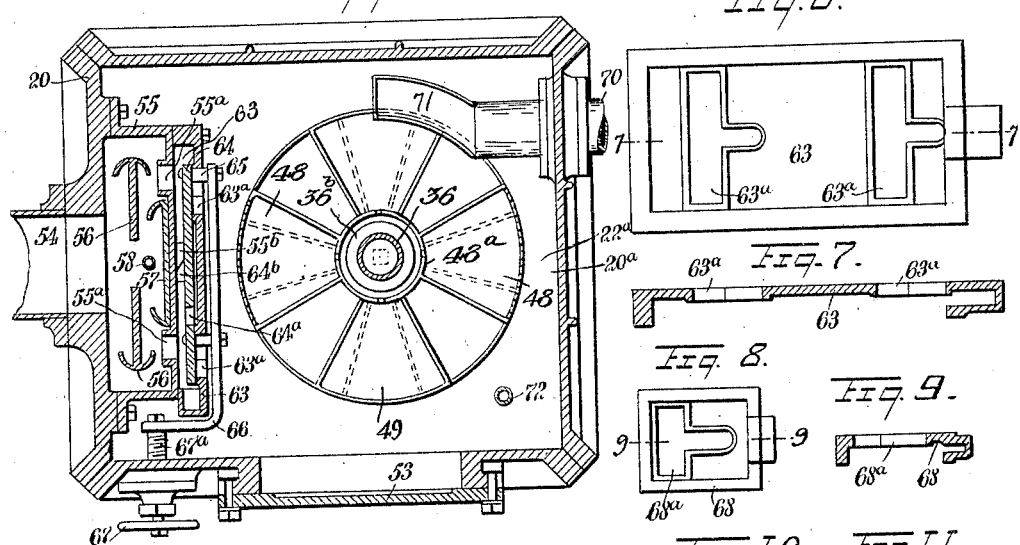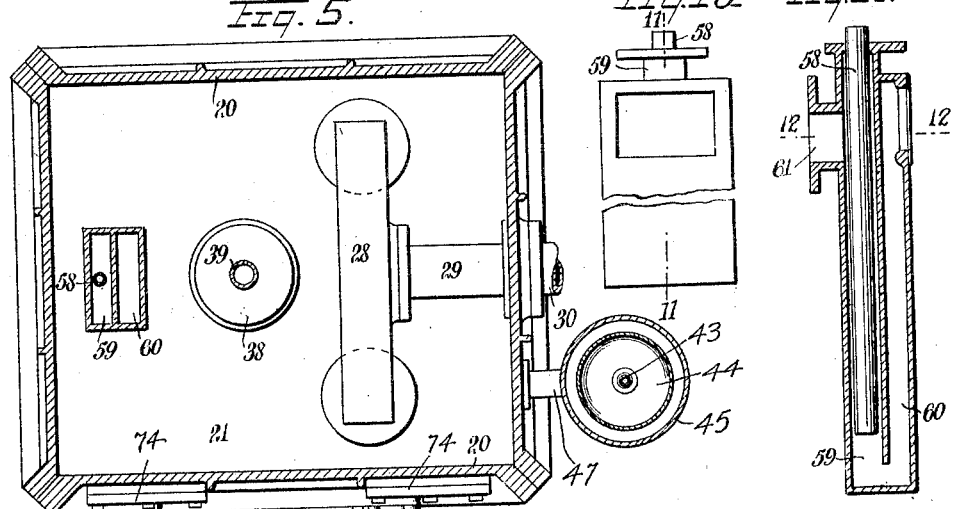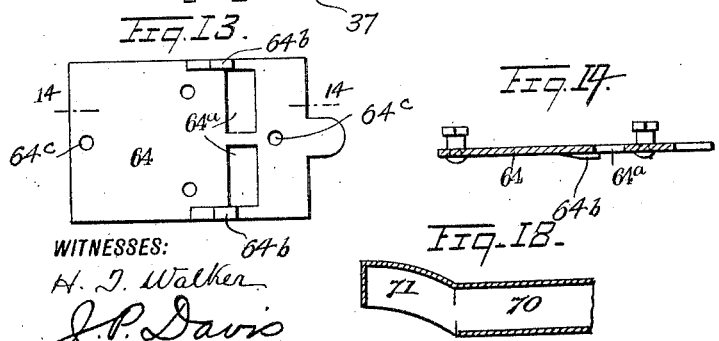

UNITED STATES PATENT OFFICE.

THOMAS OPIE ORGAN, OF PHILADELPHIA, PENNSYLVANIA.

FEED-WATER HEATER AND PURIFIER.

1,081,138.
Specification of Letters Patent.
Patented Dec. 9, 1913.

Application filed April 22, 1910. Serial No. 556,970.

*To all whom it may concern:*

Be it known that I, THOMAS OPIE ORGAN, a citizen of the United States, and a resident of Philadelphia, Germantown, in the county of Philadelphia and State of Pennsylvania, have invented a new and Improved Feed-Water Heater and Purifier, of which the following is a full, clear, and exact description.

My invention relates to feed water heaters and purifiers, more particularly of the character of the one disclosed in Letters Patent of the United States granted to me January 31, 1905, No. 781,453.

The object of my present invention is to provide various features of improvement in the construction and efficient function of the apparatus, as will be pointed out in detail in the appended claims, following a full description of one form of my invention, illustrated by the accompanying drawings, in which—

Figure 1 is a side elevation with parts in section on line 1—1 of Fig. 3; Fig. 2 is a vertical section on line 2—2 of Fig. 3; Fig. 3 is a vertical section on line 3—3 of Fig. 1; Figs. 4 and 5 are horizontal sections on lines 4—4 and 5—5, respectively of Fig. 3; Fig. 6 is a detail face view of a valve chest; Fig. 7 is a horizontal section taken on line 7—7 of Fig. 6; Fig. 8 is a face view of another valve chest; Fig. 9 is a section thereof on line 9—9 of Fig. 8; Fig. 10 is an end view of a water seal; Fig. 11 is a vertical section thereof on line 11—11 of Fig. 10; Fig. 12 is a horizontal cross section on line 12—12 of Fig. 11; Fig. 13 is a rear view of a valve plate; Fig. 14 is a section thereof on line 14—14 of Fig. 13; Fig. 15 is a vertical section through a portion of the apparatus on the line 15—15 of Fig. 3; Fig. 16 is a detail plan view of a heating tray; Fig. 17 is a front view of a portion of the apparatus, and Fig. 18 is a detail horizontal section of the trough 71 shown in Figs. 3 and 4.

The shell or casing 20, of rectangular or other suitable shape, contains a partition 21, below which are located perforated plates 22, holding a mass of suitable filtering material 23, between them. Between the partition 21 and the upper plate 22 is formed a filtered-water chamber 24, and between the lower plate 22 and the bottom of the shell is formed a settling chamber 25. Into this latter chamber water is delivered through a downtake pipe 26, provided with an automatic check valve 27 hinged in such a manner as to close when water seeks to pass upward into the pipe 26, under the conditions referred to below. From the partition 21 an upwardly arched passage 28 leads the filtered water to an outlet 29 connected with the feed water pipe 30 leading to the boiler. A vent pipe 31, provided with a valve 32, leads from the pipe 30 to a point of the shell 20 above the water line, and a relief valve 33 is placed on the pipe 30 between the vent pipe 31 and a blow-pipe 34, provided with a valve 35 and connected with the pipe 36 through which the impure feed water is supplied to the top of the apparatus at 36ª. A door 37 gives access to the filter when desired. The upper end of the downtake pipe 26 is covered by a hood 38 from which a vent pipe 39 passes upward to a point above the water level.

The pipe 36 is provided with a valve 40 operated by a lever 41 which is connected by a link 42 with the sliding stem 43 of a float 44 movable up and down in a chamber 45. The stem is hollow and perforated inside the walls of the float near the top and bottom, so that air can be admitted at the top, and the leakage if any, can be drained through the bottom hole. The float chamber 45 communicates with the interior of the shell 20 through two connections 46 and 47, one above the water level and the other below it. The float controls the operation of the valve 40 to preserve a practically constant water level.

The water issuing from the openings 36ª passes into a trough 48 provided with a partition 48ª extending above said openings, so that a water seal is formed to prevent the steam in the upper part of the shell 20 from entering the pipe 36 through said openings and causing hammering in said pipe. The trough 48 is pressed against a flange 36ᵇ at the bottom of the supply pipe, through the medium of a series of trays 49, the lowermost of which rests on a collar 50ª rigid with a rod 50 arranged to screw into the bottom of the pipe 36. The rod is square where the trays 49 are fitted on it, so that the rod may be turned by means of the trays. Preferably the lower end of the rod 50 is screw threaded into a nut 51 placed in a cross bar 52, so that the rod may be raised or lowered by rotating said rod in said nut, at times when the upper end of the rod is out of engagement with the screw-threaded socket at the bottom of the supply pipe 36.

Each of the trays 49 has an upwardly projected annular flange 49$^a$ which fits within an annular flange 49$^b$ projected downwardly from the next tray above. Each tray also has an annular flange 49$^c$ of less height that the flange 49$^a$, and two segmental wings 49$^d$, as shown best in Figs. 3, 4, and 16. The upwardly extending flanges at the edges of the wings (of the trays 49 and also of the trough 48) are preferably serrated, as shown for the trough 48 in Fig. 3. In assembling the trough and trays, they are set alternately in different positions, forming a design similar to a Maltese cross (see Fig. 4). The wings of the third and fourth trays are directly under the openings formed by the first and second trays, so that the water from the top pair of trays will fall into the third and fourth pair of wings. The fifth and sixth trays are placed the same as the first and second trays and the seventh and eighth trays the same as the third and fourth trays, and so on down to the last trays; the number of trays depending upon the size of the apparatus. By turning the trays until the upper end of the rod 50 is disengaged from the lower end of the pipe 36, the trays are brought to a position where they may be lifted off the rod 50 and removed through a door 53 of the shell.

The steam intended to heat and purify the water flowing over the trays 49, is admitted through a pipe 54 into an oil separator 55 provided with oil collecting plates 56 and 57 secured to the bottom and to the back of the separator. These plates have inturned flanges (see Figs. 3 and 4) to guide the oil downward to the outlet pipe 58, which leads to the uptake or discharge leg 59 of a water overflow seal 60. The bottom of the water overflow seal is closed, the overflow water passing through the downtake of the seal, then under the partition and then up the uptake 59 to the overflow opening 61, thus forming a U-shaped water seal. The inner leg or downtake of the water seal 60 communicates with the inerior of the shell 20 above the water level, through an opening controlled by a valve 62. The column of oil in the pipe 58 being higher and heavier than the water column in the discharge leg 59, the oil will be forced out at the bottom of the pipe 58, and owing to its smaller specific gravity it will rise to the top of the water in the discharge leg 59 and finally pass out through the overflow 61. At the same time, under normal conditions the oil in the drip pipe 58 and the water in the seal 60 will prevent steam from reaching the overflow 61.

In the rear of the separator 55 are ports 55$^a$ from which the steam, deprived of any oil it may have contained, passes into a chamber or chest 63 provided with two ports 63$^a$ leading to the upper part of the shell 20, at a level even with the lowermost tray 49, or slightly below it. The T-shape of the ports 63$^a$ will be seen best in Figs. 4, 6, and 7, which also show a U-shaped bend at one end of the chest. This bend is adapted to receive one end of a valve plate 64 having ports 64$^a$ adapted to register with one of the ports 63$^a$, while the other port 63$^a$ is adapted to be uncovered by the adjacent edge of the valve plate 64. Pins 65 connect the valve plate 64 with a yoke 66 (Figs. 2, 3, and 4) which may be moved in or out by any suitable mechanism, on the outside of the shell, as the hand wheel 67, having a stem 67$^a$ held against sliding lengthwise and screw-threaded into the yoke. The lower end of the yoke engages a pin 62$^a$ projected from the valve 62, so that the valves 62 and 64 will be opened and closed in unison. The valve 62 slides in a small chest 68 secured to the water seal 60 (see Figs. 3, 8, and 9), one edge of the chest being U-shaped. This chest also has a T-shaped slot (68$^a$) for the passage of the pin 62$^a$ and serving as a port controlled by the valve 62. The edges of the ports are raised to form better seats for the valves. Steam ports 64$^c$ are formed in that part of the valve plate 64, which does not register with the main steam ports, for the purpose of admitting steam between the valve plate 64 and the valve chest or casing 63, to partly balance the valve and cause it to be more easily moved, by balancing the pressure on the back and front of the valve plate. To hold the valve 64 tightly against its seat when closed, I have shown it provided with beveled lugs 64$^b$ (Figs. 4, 13, and 14) adapted to engage corresponding lugs 55$^b$ on the rear wall of the separator 55. Any steam which does not enter the upper compartment of the shell 20 through the ports 63$^a$, 64$^a$, passes out through an opening 69 at the top, either simply to the atmosphere, or to a place of use, such as a heating system or a drying apparatus.

A pipe 70 carrying the drip or condensate from the steam-heating system, leads to a trough 71 located within the shell 20 and above the top tray 49. This trough has a segmental discharge portion as shown best in Figs. 4 and 18.

A vent pipe 72 (Figs. 1 and 4) leads from outside the shell 20 to a point within it above the water level. From the settling chamber 25 a pipe 73 leads to a sewer or other place of discharge, this connection being normally closed by a valve (not shown). Plates 74 normally close openings leading to the compartment above the partition 21 (see Fig. 15).

Water is admitted from the pipe 36, the amount being controlled by the float 44. This water flows through the trough 48 and down over the series of trays 49, the staggered arrangement of which distributes the water, while the segmental shape of the spaced wings 49$^d$ provides ample spaces for the circulation of the steam admitted from the inlet 54 through the ports 63$^a$, in an amount depending on the position of the valve 64. The plates 56, 57 collect any oil contained in the steam as well as any water resulting from condensation in the separator 55, and lead such liquid through the pipe 58 into the discharge leg 59, as described above. The inturned edges of the plates 56, 57, protect the down-flowing oil and water from the action of the steam current and prevent them from being carried along by the steam. The ports 55$^a$ are preferably formed with flanges on the side facing the inlet 54, as a protection from the grease which vaporizes at the temperature of the exhaust steam: such grease might adhere to, and flow down, the back of the separator 55 and if the flanges at the ports 55$^a$ were omitted, the grease would enter the ports and be carried farther by the steam. The purified water after passing over the trays collects in the settling chamber above the partition 21 and then passes up under the hood 38 and down through the pipe 26 to the lower settling chamber 25. The steam not used for heating the feed water passes out through the opening 69 and may be utilized in a steam-heating system. The drip water from this system may be returned through the pipe 70 and be exposed to the action of steam in the trays 49, together with the water flowing from the pipe 36. In case of any excessive steam pressure, steam would pass through the valve 62, the downtake of the overflow 60 and the uptake 59, to the outlet 61. The positive connection of the valves 62 and 64 precludes the possibility of opening the valve 64 alone.

From the settling chamber 25, the water rises through the filter 23 to the filtered water chamber 24, from which it passes through the pipes 28 and 29 to the feed water pipe 30 and to the boiler. During this purifying and heating operation, the valve 32 is opened and the valve 35 is closed. When it is desired to wash the filter by "blowing it out," the valves 32, 62 and 64 are closed and the valve 35 is opened, also the valve in the discharge pipe 73. Water will then pass into the shell through the pipes 30, 29 and 28. The water will now pass through the filter 23 in the reverse direction, that is, downwardly; the valve 27 will close automatically so that the water issuing at the bottom of the filter cannot enter the pipe 26 but can only pass out through the discharge pipe 73.

Various modifications may be made without departing from the nature of my invention as set forth in the appended claims.

Having thus described my invention, I claim as new and desire to secure by Letters Patent:

1. A feed water heater provided with a shell, means for supplying water to the interior of the shell, a steam inlet, a passage for leading a portion of the steam into contact with the water to be heated, a sliding valve for varying the amount of steam admitted through said passage, an outlet for the remaining portion of the steam, an overflow, a valve arranged to slide in the same direction as the first-named valve and controlling the connection from the interior of the shell to the overflow, a yoke connecting said sliding valves, and means for operating the yoke.

2. A heater provided with an oil separator having an inlet for impure steam and an outlet for purified steam, said outlet being located in the wall of the separator which is opposite to the inlet, and being provided with a flange projecting toward the inlet, a chest, the inlet of which is formed by the outlet of the separator, said chest having an outlet to the interior of the heater, and a valve located within said chest and controlling its outlet.

3. A heater provided with an oil separator having an inlet for impure steam and an outlet for purified steam, said outlet being located in the wall of the separator which is opposite to the inlet, and being provided with a flange projecting toward the inlet and also with an oil outlet forward of the steam outlet, a chest, the inlet of which is formed by the purified steam outlet of the separator, said chest having an outlet to the interior of the heater, and a valve located within said chest and controlling its outlet.

In testimony whereof I have signed my name to this specification in the presence of two subscribing witnesses.

THOMAS OPIE ORGAN.

Witnesses:
 FREDK. M. BENNETT,
 GEORGE G. KNECHT.